(12) United States Patent
Svensson et al.

(10) Patent No.: US 10,509,713 B2
(45) Date of Patent: Dec. 17, 2019

(54) OBSERVATION BY A DEBUG HOST WITH MEMORY MODEL AND TIMING OFFSET CALCULATION BETWEEN INSTRUCTION AND DATA TRACES OF SOFTWARE EXECUTION CARRIED ON IN A DEBUG TARGET HAVING A MAIN MEMORY AND A CACHE ARRANGEMENT

(71) Applicant: Telefonaktiebolaget L M Ericsson (publ), Stockholm (SE)

(72) Inventors: Peter Svensson, Lund (SE); Bengt Wikenfalk, Helsingborg (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 408 days.

(21) Appl. No.: 14/769,812

(22) PCT Filed: Aug. 18, 2015

(86) PCT No.: PCT/EP2015/068968
§ 371 (c)(1),
(2) Date: Aug. 22, 2015

(87) PCT Pub. No.: WO2017/028908
PCT Pub. Date: Feb. 23, 2017

(65) Prior Publication Data
US 2017/0052876 A1 Feb. 23, 2017

(51) Int. Cl.
*G06F 11/34* (2006.01)
*G06F 11/36* (2006.01)
(52) U.S. Cl.
CPC ...... *G06F 11/3461* (2013.01); *G06F 11/3447* (2013.01); *G06F 11/3466* (2013.01); *G06F 11/3636* (2013.01); *G06F 11/3648* (2013.01)

(58) Field of Classification Search
CPC ............ G06F 11/3447; G06F 11/3466; G06F 11/3636; G06F 11/3648; G06F 11/3457; G06F 11/3461
See application file for complete search history.

(56) References Cited

U.S. PATENT DOCUMENTS 5,815,688 A * 9/1998 Averill .................. G06F 11/26
714/E11.159
6,901,581 B1 * 5/2005 Schneider ........... G06F 11/3636
714/E11.212
(Continued)

FOREIGN PATENT DOCUMENTS

GB 2371897 A 8/2002
WO 2012087330 A2 6/2012

OTHER PUBLICATIONS

PCT International Search Report, dated Oct. 29, 2015, in connection with International Application No. PCT/EP2015/068968, all pages.
(Continued)

*Primary Examiner* — David J. Huisman
(74) *Attorney, Agent, or Firm* — Leffler Intellectual Property Law, PLLC

(57) ABSTRACT

A method, performed in a debug host, for observing software execution on a computer having one or more processor cores, a cache attached to the one or more processor cores via respective execution pipelines forming a cache arrangement, and a memory, comprises obtaining an instruction trace of the cache arrangement and a data trace for data being loaded from the memory into the cache. The instruction trace is synchronized with the data trace to generate a synchronized data trace and/or a synchronized instruction trace. A state of a memory model, representing a memory readable by the one or more processor cores via a respective
(Continued)

instruction is updated using the synchronized data trace and the synchronized instruction trace.

18 Claims, 5 Drawing Sheets

(56) References Cited

U.S. PATENT DOCUMENTS

| | | | |
|---|---|---|---|
| 7,080,283 B1* | 7/2006 | Songer | G06F 11/3636 714/30 |
| 7,653,899 B1 | 1/2010 | Lindahl et al. | |
| 2003/0018929 A1 | 1/2003 | Bardsley et al. | |
| 2003/0033480 A1* | 2/2003 | Jeremiassen | G06F 8/4442 711/118 |
| 2003/0135789 A1 | 7/2003 | DeWitt, Jr. et al. | |
| 2006/0255977 A1 | 11/2006 | Swoboda | |
| 2006/0255982 A1 | 11/2006 | Agarwala et al. | |
| 2007/0038429 A1* | 2/2007 | Tatsuoka | G06F 17/5022 703/14 |
| 2007/0192079 A1* | 8/2007 | Rompaey | G06F 11/3457 703/19 |
| 2008/0256396 A1 | 10/2008 | Giannini et al. | |
| 2009/0249302 A1 | 10/2009 | Xu et al. | |
| 2009/0276665 A1* | 11/2009 | Mayer | G06F 11/3636 714/38.13 |
| 2011/0145798 A1* | 6/2011 | Taillefer | G06F 11/362 717/129 |
| 2012/0272011 A1 | 10/2012 | Carrie et al. | |
| 2013/0246741 A1 | 9/2013 | Gainey, Jr. et al. | |
| 2014/0089902 A1 | 3/2014 | Guthrie et al. | |

OTHER PUBLICATIONS

ETM Trace Macrocell Architecture Specification (ARM Limited). Published on or before May 6, 2015 on the arm.com web site. ARM reference No. ARM IHI 0014Q. 420 pages total; Relevance: Chapter 7, located at pp. 7-299 through 7-362.

General command reference guide C (Lauterbach GmbH) published on or before May 6, 2015 on http://www2.lauterbach.com/pdf/general_ref_c.pdf. Inventor Comment: 146 pages total; Relevance: Chapter "CTS", located at pp. 97 through 146.

ARM ETM Trace, Lauterbach GmbH, published on or before May 6, 2015 on http://www2.lauterbach.com/pdf/trace_arm_etm.pdf. Inventor Comment: 161 pages total; Relevance: Chapter "ETM SmartTrace", located at pp. 60 through 62.

PCT Written Opinion, dated Jul. 20, 2017, in connection with International Application No. PCT/EP2015/068968, all pages.

PCT International Preliminary Report on Patentability, dated Nov. 17, 2017, in connection with International Application No. PCT/EP2015/068968, all pages.

\* cited by examiner

OBSERVATION BY A DEBUG HOST WITH MEMORY MODEL AND TIMING OFFSET CALCULATION BETWEEN INSTRUCTION AND DATA TRACES OF SOFTWARE EXECUTION CARRIED ON IN A DEBUG TARGET HAVING A MAIN MEMORY AND A CACHE ARRANGEMENT

TECHNICAL FIELD

The present disclosure relates to a method performed in a debug host, for observing software execution on a computer having one or more processor cores, a cache attached to the one or more processor cores via respective execution pipelines and a memory. The disclosure also relates to a debug host and a debug target.

BACKGROUND

Many SOCs (System On Chip) today have the ability to trace instructions that are executed on their respective main cores units. Such traceability enables the programmers to review and analyze what code the respective cores or CPUs have executed, a valuable instrument in cases where proper execution of code failed. This debugging is however not only interesting for "post-mortem" analysis, but also for enhancing performance or reducing power consumption of the SOCs. Some SOCs also support tracing the data the one or more CPUs are reading and/or writing. The result from a tracing operation is called trace, for example instruction trace or data trace. A data trace is different from an instruction trace, as the former one generally includes the results or output from certain instructions executed by the CPU. An example of a SOC supporting the generation of an instruction trace is the Exynos 5250 from Samsung based on an ARM® Cortex®-A15 processor. Other SOCs from this vendor, like the Exynos 5420 including a Cortex®-A7 processor also support data tracing. Most cores from ARM Ltd support tracing instructions (e.g. ARM Cortex®-A15) and some also support tracing data (e.g. ARM Cortex®A7). The document Embedded Trace Macrocell Architecture Specification, ARM Limited, and published under the URL infocenter.arm.com/help/index.jsp, reference number: ARM IHI 0014Q provides in chapter 7 more information about the tracing procedure and the access to the hardware to obtain such trace.

The traces, both an instruction trace and where available a data trace are received from the debug target, e.g. an SOC with one or more processor cores, and stored on a separate computer, or a debug host for later analysis. This lets the programmer determine what and how a certain piece of code has been executed and what kind of data has been read or written, respectively.

A trivial implementation for an instruction trace contains all instruction addresses in the instruction trace. In some implementations such as the one mentioned above, the amount of trace information is reduced by only outputting the target address of any indirect branches or whether any conditional instructions were executed or skipped. To fully reconstruct the instruction trace the debug host needs access to the same instructions as were executed. These can be obtained by for example reading the memory from the target or loading a file containing the same binary on the debug host.

While the instruction trace enables the programmer to obtain information about the instructions performed by the CPU, the full state of the CPU at any given time can be reconstructed only together with the data trace. The data trace also enables the programmer to reconstruct the state of variables in memory, except for the effect of other CPUs or hardware accelerators without data trace. This can be used to implement "reverse execution" in the debugger, where the debug host can display the state of a program as it was at any time during the trace session. An example of this is the Context Tracking System facility (CTS) in the TRACE32 software from Lauterbach Datentechnik GmbH to be found at the URL: www2.lauterbach.com/pdf/general_ref_c.pdf. The CTS can also optionally be used to fill in small holes in a trace by executing the instructions the same way as the CPU normally would.

Traditionally, the information for the data trace as well as for the instruction trace is extracted from the debug target by an interface giving access to the pipeline in the CPU (or close to it) of the debug target, to enable precise mapping of data to the corresponding instruction. To allow reconstructing the state of the CPU at any given time all read accesses the program performs are output in the trace stream. The trace may be enabled only for parts of the program. This cuts down the volume of the trace stream, but also limits visibility from the debug host.

Trace streams from different sources are normally not fully synchronized. If they are separately extracted from the debug target and then synchronized in the receiver by adding proper time stamps and the like, a synchronization uncertainty of several us, e.g. 30 µs, can occur. If data and instruction trace are merged on the SOC the uncertainty decreases to about 200 ns, which can be further reduced to about 30 ns when synchronization markers are added. The uncertainties shown above are rough guidelines and will vary significantly between implementations today.

Although there are exceptions, modern high performance CPUs often lack data trace capability. One reason is that it is becoming hard to extract the data trace due to its high volume of data. In a hypothetical CPU operating at 1 GHz and capable of an average execution of one instruction every two clock cycles with a "read" instruction of four bytes every fifth instruction, the amount of data to be read increases to: (1 GHz/2)/5*(4+4) Bytes=800 MBytes/s=6.4 Gbps. Here, 4+4 Bytes are used, meaning that respective 4 bytes of trace and data are traced.

Typical interfaces available for trace transfer to the debug host are limited to about 10-20 Gbps. Examples here are 10GBase-T Ethernet, and parallel and serial trace based on ARM® CoreSight™ trace technology. While there are interfaces capable of these or even faster bit rates, the interfaces typically consume too much power, too many pins or are too hard to route on a PCB. This limitation has caused a decline SOCs capable of data tracing.

SUMMARY

Nevertheless, there is still a need for a less complex data tracing capabilities enabling a programmer to reconstruct the state of an SOC with one or more processor cores for debugging purposes.

This object is met by the subject matter of the independent claims.

This disclosure pertains to a method performed in a debug host, for observing software execution on a computer having one or more processor cores, a cache attached to the one or more processor cores via respective execution pipelines, thereby forming a cache arrangement and a memory, comprises obtaining an instruction trace of the cache arrangement and a data trace for data being loaded from the memory into the cache. The instruction trace is synchronized with the data trace to generate a synchronized data trace and/or a synchronized instruction trace. Further, a state of a memory model is updated using the synchronized data trace and the synchronized instruction trace, said memory model representing a memory readable by the one or more processor cores via a respective instruction.

In accordance with the present disclosure it is therefore proposed to trace data that is read by the one or more processor cores from a memory that is accessible to those one or more processor cores. For this purpose, a memory model is proposed that represents the memory accessible by the one or more processor cores. Any access to the memory changing its state also updates the memory model, thereby generating a sequence of memory model states. The resulting sequence therefore represents the memory "visible" to the one or more processor cores at the respective times. Together with the instruction trace, one can recover any state of memory that the processor core(s) observed, as well as any state of the system processor core and its accessible memory.

In an aspect of the disclosure the update of the memory model is triggered by data from the synchronized data trace and/or instructions from the synchronized instruction trace accessing the memory readable by the one or more processor cores.

In another aspect, the update for the memory model also comprises at least one of providing said memory model and setting an initial state in said memory model.

The memory readable, or more generally accessible, by the one or more processor cores via a respective instruction may comprise for example, the cache arrangement or parts thereof, internal registers outside the one or more processor cores or any kind of buffers or storage, to which the one or more processor cores have direct read access.

The obtained traces can be a combined trace including the instruction trace and the data trace. The combined trace is obtained and then separated into the instruction trace and the data trace, respectively.

In an embodiment, the different traces are obtained by providing time stamps to the data being loaded and at least to instructions in the instruction trace accessing the cache arrangement. This may simplify a later synchronization between the instruction and the data trace. The time stamps may comprise a counter being incremented and aligned with each of the data and the instructions or a representation of the clock cycle aligned with the data and the instructions. For synchronization, an aspect proposes to obtain an address, a word line, a page table and the like in the cache arrangement for data being loaded from the main memory into the cache arrangement in the data trace. An instruction in the instruction trace accessing the cache arrangement and referring to said address is identified and the offset of the respective time stamps between said data and said instruction is calculated to evaluate an offset. This procedure can be repeated to maintain the synchronization throughout the entire trace in cases where de-synchronization due to erroneous readings for example may occur.

Prior to updating the memory model, the memory model is set to an initial state. There are several different ways to obtain an initial state of the memory model. For instance, the memory model may be initialised with known data obtainable from the software execution. In this regard, the memory model is primed with code being known a priori. The memory model may also be initialised with previously stored content of translation tables or with data stored in the memory represented by said memory model prior to obtaining the instruction and data trace. In an alternative solution the memory model is initialised as not having known data yet. For example, all memory locations are marked as not having valid data in the memory model. An instruction cycle during which the instruction or data (including page table entries) is "unknown" in the memory model aborts the instruction simulation until the next sync packet in the instruction trace. The memory model is built up mostly from the data trace stream to begin with. No a priori knowledge of the instructions, data or page tables is needed.

After initialising the memory model, the state of the memory model is updated. Said update is triggered for example by an instruction for storing data from the execution pipeline into the cache arrangement, more generally an instruction for storing data in the memory readable by the one or more processor cores. The memory model is also updated by data returned to the cache arrangement as found in the data trace.

In a further aspect, the proposed method comprises an execution model representing the execution pipelines coupled to the respective ones, of the one or more processor cores. The execution model is initialised to set modelled registers and internal configuration of the one or more processor cores to a respective initial state. In this regard, the execution model is updated with the synchronized instruction trace. Further, the memory model can be updated also with data produced by one or more respective instructions by the execution model. In an alternative embodiment, the execution model may be initialised with synchronization information in the instruction trace stream.

In yet another aspect, the present disclosure relates to a computer program comprising program code for performing the steps of any of the aspects of the methods described above, when said computer program is executed on a processor of a debug host. A debug host in this regard comprises in an aspect of the disclosure a processor and memory and a trace interface configured to receive a trace stream, comprising the data trace and the instruction trace. To provide the data and instruction trace separately, the debug host comprises in an aspect a trace router, configured to receive the trace stream from the trace interface and to separate the received stream into the instruction trace and the data trace. The memory model may be generated within the memory of the debug host and the execution model is at least partly performed in the processor.

In another aspect, the debug target comprises one or more processor cores, a cache arrangement attached to the one or more processor cores via respective execution pipelines and a main memory coupled to the cache arrangement. A trace interface is coupled to the cache arrangement and configured to generate a data trace for data being loaded from the main memory into the cache arrangement or into the one or more processor cores, and an instruction trace of instructions on the respective execution pipeline. Time stamps are assigned to said traced data and said traced instructions and a trace stream is provided at the trace interface including said time-stamped traced data and traced instructions.

BRIEF DESCRIPTION OF THE DRAWINGS

Several more aspects and advantages of the present disclosure become apparent to a person skilled in the art with respect to the detailed description and in view of the following drawings in which.

DETAILED DESCRIPTION

Figure 1:
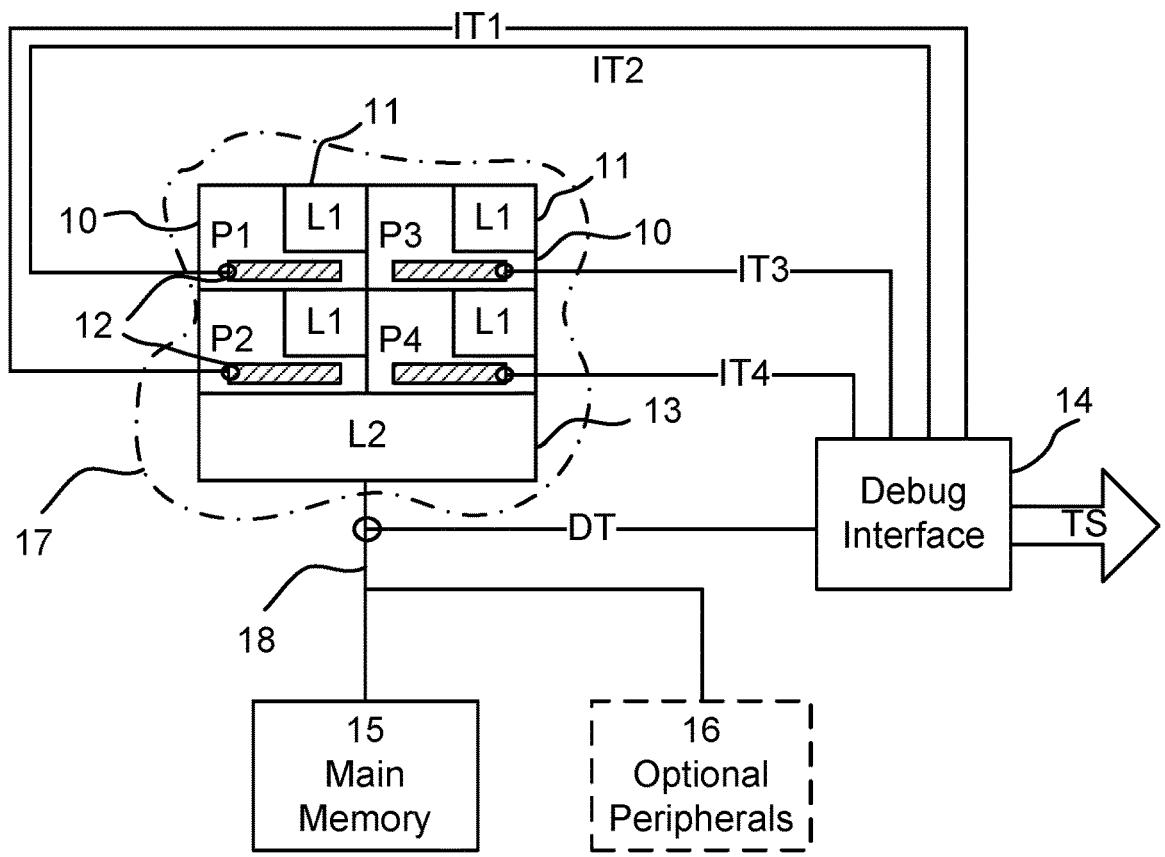
FIG. 1 shows an example of a debug target illustrating some aspect of the present disclosure.

The maximum data rate described in the introductory part assumes that the required data that an execution pipeline needs to access from a memory, is available immediately and/or that writes can complete without delay. In modern SOCs the memory is normally hierarchical in nature, having one or more levels of caches between the CPU execution pipeline and the main memory. If the execution pipeline does find the required data in the cache, called cache hit, then the data can be processed without significant delay. As the cache arrangement is hierarchical, the access times to the respective different levels become longer depending on the cache level. In the case the requested data is not found in the cache arrangement, a so called cache miss, the processor normally requests the data to be loaded from the memory into the cache. This process for accessing the main memory and loading data into the cache for further processing requires approximately 100 clock cycles or more during which the processor core is either idle or executes different instructions. If none of the read data is found in a cache, the data trace needs only to handle approximately 6.4 Gbps/100=64 Mbps. The non-blocking instructions are ignored since they constitute at most 5/105 of the cycles and are to some degree pipelined with the load/stores, reducing their impact. Prefetching can improve performance significantly for predictable cache misses. Predictable cache misses mostly imply linear or nearly linear reads.

The instruction trace reconstruction in a debug host from conditional instruction pass/fail information in the data trace requires access to the same instructions as the respective processor core executed. Reading such instructions from the debug target containing the processor core often presents practical problems. A reading operation from the debug target memory by the debug host is typically slow. Using a 20 MHz JTAG interface, the best case performance is approximately 2 MB/s. With most implementations the real performance is far lower. Depending on the operating system on the debug target, the memory may have been reused at the time the trace is taken and received by the debug host. Another problem arises during use of virtual memory with demand paging. In such cases the instructions traced may not even be in the memory of the target at the same time. The same applies for non-virtual memory if overlays are being used. In both cases the same memory address can hold different code over time. Self-modifying code can cause a problem since it means that the same memory location can hold different instructions at different times. This becomes an issue both in cases where the instructions are read from the target and when loading the software directly into the debug host. In both cases the dynamic changes are not captured. Trying to reconstruct the instruction flow will fail when the instructions actually experienced by the processor core do not match what is in the debug host.

The present disclosure provides a solution to achieve the same debug and observability features of a full data trace but with significantly less bandwidth needed in most cases. It uses the fact that a processor core is normally of deterministic nature, when the external stimuli are known. By omitting logging data load/stores that can otherwise be recreated deterministically on the debug host the volume of the trace is significantly reduced.

The large number of bytes that the data trace has to handle is mostly due to the high performance between the CPU execution pipeline and the cache or caches. The caches are inserted below the CPU core(s) to exploit locality and for them to help a large fraction of all reads from the CPU core must actually result in a "hit" in the cache. In the case of such a cache hit, no request has to be performed out of the cache to the rest of the system. Instead of tracing data directly at the execution pipeline or between the pipeline and the first cache like in some embodiments of the prior art, the present disclosure proposes to trace only unknown data entering the cache from the outside and an outside memory in particular. These so called cache fill requests include a much smaller volume of data than all the data that is read by the processor core(s) itself since most of the reads from the processor core(s) are fulfilled directly from the cache.

In the proposed solution a debug host contains a memory model of a memory available to the processor core(s). The memory model varies over time, similar to a movie of the memory wherein each state of the memory model corresponds to a "frame". Instructions that are executed reference to a frame in this movie. Any update to the memory available by the execution pipeline creates a state of the memory model or a new frame, to represent the memory the processor core(s) can observe at a given time. The events causing an update of the memory and the corresponding memory model can include cache fills, non-cacheable reads, writes from the execution pipeline itself or any other mechanism that can write to the memory observable by the pipeline. For example, a bus master that writes directly to the main memory is already covered by the non-cacheable reads or the cache fills and does not have to be treated specially. On the other hand, a bus master capable of writing directly to the cache has to have its data traced since its updates to the memory that the processor core(s) can observe would otherwise not be captured.

As a further improvement, the virtual address map can be reconstructed on the fly and for each frame of the memory model from the page table data that is available to a memory management unit (MMU) in the respective processor core. Thus all data accesses from the execution pipeline can be reconstructed with both their physical and virtual addresses.

Depending on the cache type and the tracing of information from the main memory into the cache or the memory observable by the one or more processor cores, the instructions themselves can also be determined. This removes the need for a priori knowledge by the debug host of the instructions of a program executed on the debug target. If the cache level being traced is unified between instructions and data there is no overhead since the cache line fills associated with the instructions are anyway traced along with the data. If the cache level being traced is still separate (known as Harvard architecture) including the cache fills for instructions increases the overall data trace.

If there are several cache levels then a choice can be made of which cache level is traced. If the cache that is traced serves several cores then the writes from all cores must be taken into account when creating the memory model in the debug host. Consequently, the instructions by cores sharing the same cache have to be traced to enable reconstruction of accesses, particular write accesses that updates the cache from those cores. Otherwise, the memory model of the memory observable by the cores would be incomplete. This enables certain flexibility and adaptation to available bandwidth, by choosing between tracing a cache observable by a processor core that is under investigation and not shared with as many (if any) other processor cores or tracing data of a cache observable by several processor cores thereby generating a smaller data trace (less cache fills into said cache due to larger cache size), but at the price of also having to trace instructions from all the cores sharing said cache.

Data transfers between two or more processor cores including data transfers between per-core caches closer to the pipeline of each core than the traced cache does not need to be traced in architectures with cache coherency. Writes from any core can be seen as updating a common memory model in such systems. Write accesses from masters outside/below the cache being traced do not have to be traced directly since their updates will be visible in the traced cache fills when the processor core(s) access the data or more generally whenever such data is returned to the cache.

The present disclosure including the memory model and the updates thereof can be used for analyzing software executed on a debug host having said processor core(s). The analysis enables to identify certain dangerous or hazardous operations quite easily by evaluating the recreated instruction and data streams. An example for a hazardous operation is when a write to a memory is later followed by using that memory as a page table entry without first invalidating the corresponding potential entry in the translation lookaside buffer (TLB). This type of coding is non-deterministic in so far as it depends on the contents of the TLB which may vary between runs. The debug host using the proposed approach can catch this behavior and similar unsafe constructs. Another example is updates to code (self-modifying or DMA-updated code) without subsequent invalidating the instruction cache.

FIG. 1 shows an embodiment of a debug target in accordance with some aspects of the present disclosure. In this example the debug target is a SOC (system on chip), which for example is integrated in a wireless mobile device. The debug target may also comprise a larger computer system, including periphery and the like or an embedded system or other dedicated hardware. The debug target comprises several processor cores 10, each of them having a dedicated level 1 cache 11 connected to the respective cores via a respective execution pipeline 12. While the level one cache 11 is dedicated to their respective cores 10, the system in this example also includes a shared or common level two cache 13. Several examples of such SOC are commerciallly available, for example the Cortex®-A processor series designed and offered by ARM® Ltd. The processor cores 10, the respective level one cache and the level two caches form a cache arrangement 17, illustrated in FIG. 1 by the dashed-dotted line.

The debug target further comprises an instruction and data bus 18 coupling the cache arrangement with a main memory 15 and optional peripherals 16. Data and instructions for execution are loaded from the main memory 15 into the cache arrangement. Particularly, data is returned from the main memory into one of the different caches in response to respective instructions. Data or instructions may also be loaded directly into one of the processors in response to a respective instruction, a process called cache bypass or non-cacheable reads. For example certain peripherals 16 may return data directly and without the data being cached.

The debug target also comprises a debug interface 14. Said debug interface is coupled to the instruction and data bus 18 to obtain a data trace DT of all data being returned to the cache arrangement 17. Further, debug interface 14 is coupled to the processor cores 10, for example via the execution pipelines 12 to obtain a respective instruction trace IT1 to IT4 for each of the processor cores. These instruction traces contain—inter alia—load or store instructions. They target the data bus 18 and may or may not pass through and affect the different caches depending on the cacheable or non-cacheable nature of the instruction and/or configuration of the processor cores, for example page tables, memory regions etc.

In case of a cache miss, instructions for returning data from the main memory into the caches are traced by the instruction stream as well as by-pass cache instructions and non-cacheable instructions. The interface 14 therefore traces the instruction trace stream IT and data trace stream DT and provides at its output a respective instruction and data trace TS.

Figure 2:
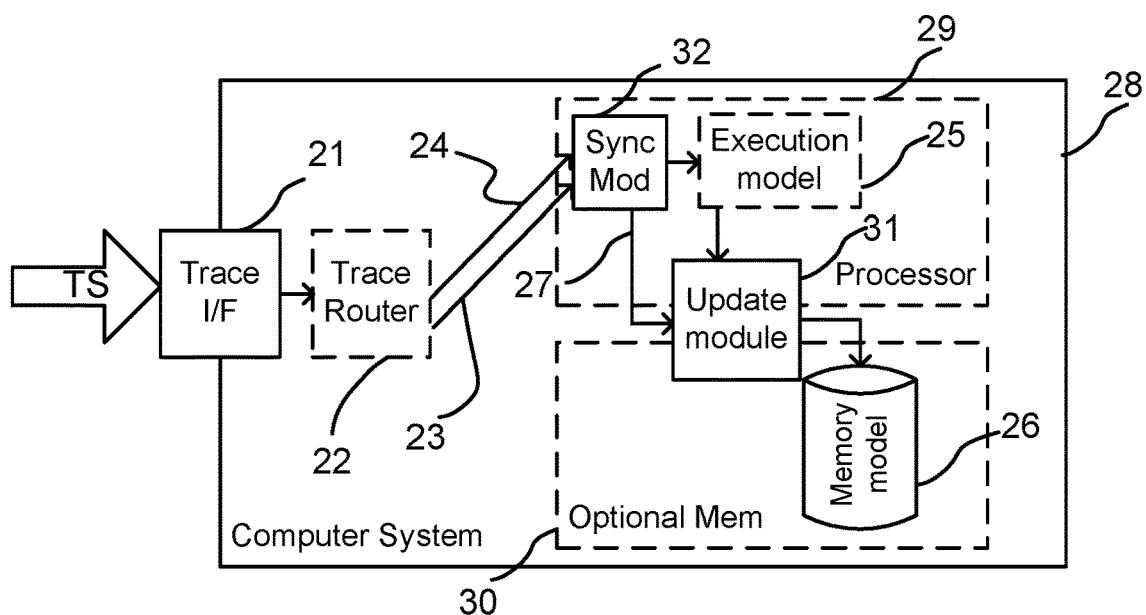
FIG. 2 illustrates an embodiment of a debug host according to the present disclosure.

FIG. 2 shows an embodiment of the debug host illustrating several aspects of the present disclosure. The debug host in this example is computer system 28 separated from the debug target. It comprises one or more processor cores 29 and a memory 30. The processor cores 29 and the memory 30 are coupled via an optional trace router 22 to the trace interface 21 receiving trace stream TS. Trace stream TS comprises the combined data and instruction trace stream from a debug target (not shown). The optional trace router 22 can be implemented either in hardware (then most likely coupled closely to the trace receiver 21) or a software component being executed in processor 29). In this example, trace router 22 separates the instruction trace stream and the data trace stream and provide the respective trace streams 23 and 24 to a synchronization module 32. The synchronization module 32 in this case is implemented in the processor as an executed program for example, but it can also be implemented in hardware and/or as a separate module. In case the instruction trace 23 and data trace 24 are already synchronized the synchronization modules ensures that the respective instructions and data, respectively are forwarded in the right order. If synchronization is not given, synchronization module 32 buffers the stream and performs a synchronization to ensure proper analysis.

Optional memory 30 of the debug host comprises a memory model 26 in accordance with the present disclosure. Memory model 26 is a representation of a memory in the debug target being observable to the one or more processor cores of the debug target. In other words, the memory model represents the data space to which the processor cores of the debug target have directs access to via respective read and write instructions. Further, debug host 28 comprises a deterministic execution model 25 for emulating execution of instructions on the one or more processor cores of the debug target. Execution model 25 is implemented in processor 29. Finally, the debug host comprises an update module 31 coupled to the synchronization module 32, the memory model 26 and in this example to the execution model 25.

The separated instruction trace stream 23 and trace data stream 24 are forwarded from the trace router 22 to the synchronization module 32. Instructions in the instruction trace are sent to the execution model to simulate the behavior of the one or more processor cores of the debug target. Hence, the instruction stream enables the execution model to simulate all instructions as if they were executed on the debug target. The data trace is forwarded 27 to the update module 31, which may also receive commands from the execution model. This information is used by the update module 31 to update the state of the memory model. For example, in case of instructions requesting data to be loaded, update module 31 accesses memory model 26. Hence, memory model 26 comprises the same information as the memory area being read in the debug target during the execution of said instructions. As a result, the state of the memory model is updated in response to data being loaded into the memory model or store instruction from the execution model such that the execution model at any point during the emulation "observes" the timely correct content of the memory model. These updates of the memory model form a movie, where each frame is a snapshot of what the memory contents the processor scores in the debug target have access to at that particular time.

However, the memory model does not model cache memories directly. Instead it is a model of the memory that can be observed by the processor core(s) of the debug host regardless of if a particular memory area was held in the caches at that time or not or even if the memory area was cacheable. The memory model only cares about what data would result from a read instruction by the processor core(s) at a given time, not how that read actually occurred. A cache miss or non-cacheable request will have the corresponding read data in the data trace and thus also in the reconstructed "movie" and available before the simulated processor core in the execution model reads it from the memory model.

The instruction trace received by the execution model includes synchronized instructions to ensure that instructions accessing the memory model either by read or write operations observe the correct content or "movie frame" of the memory model. The instruction trace can include instructions, such as interrupts, that contain external stimuli to the processor core(s) of the debug target. Finally, the instruction trace can include some normally redundant information, such as branch targets and state synchronization. Those are used by the trace router or other elements in the debug host to verify that it is still synchronized. Hence, the models in the debug host enable the host to recreate the activity of the processor core(s) of the debug target including all data for uses such as debugging, observation or crash analysis.

Figure 3:
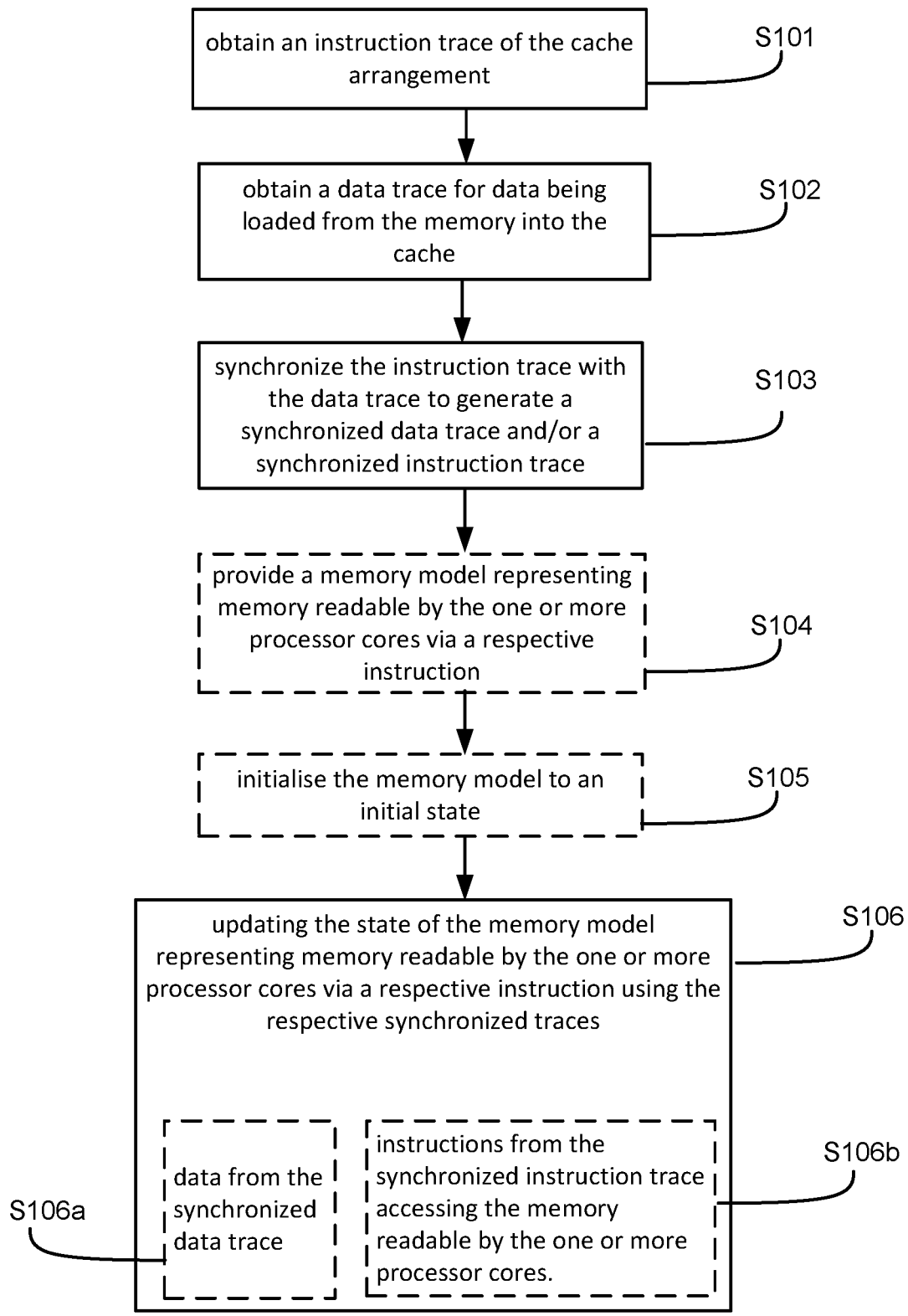
FIG. 3 illustrates a first embodiment of a method according to the present disclosure.

FIG. 3 shows an embodiment of a method according to the present disclosure. The method is performed in a debug host to observe, analyze or debug software execution on a computer. The computer comprises one or more processor cores, a cache attached to the one or more processor cores via respective execution pipelines and a main memory. The processor core(s) and the caches form a cache arrangement. In step S101 of the method, an instruction trace of the cache arrangement is obtained; in the next step S102 a data trace for data being loaded from the main memory into the cache arrangement is obtained. These two steps will ensure that all reads are obtained in the data trace. For the purpose of this disclosure, it should be noted that cache-bypass or non-cacheable access or other instruction directly affecting the cache arrangement are either captured by the data trace or by the instruction trace. Further, the instruction trace does also comprise instruction accessing the caches within the cache arrangement or accesses between two caches within the arrangement.

The method continues with step S103, namely synchronizing the instruction trace with the data trace to generate a synchronized data trace and/or a synchronized instruction trace. A memory model is provided in optional step S104 representing a memory readable or accessible by the one or more processor cores via a respective instruction. The memory model is set to an initial state in optional step S105 and then updated using the synchronized data trace and the synchronized instruction trace in step S106. Optionally the update is triggered by data from the synchronized data trace S106a and/or instructions from the synchronized instruction trace accessing the memory readable by the one or more processor cores S106b. Hence, with each update a new state of the memory model is generated thereby forming a movie of the memory model, wherein each frame of the memory model is observable.

Figure 4:
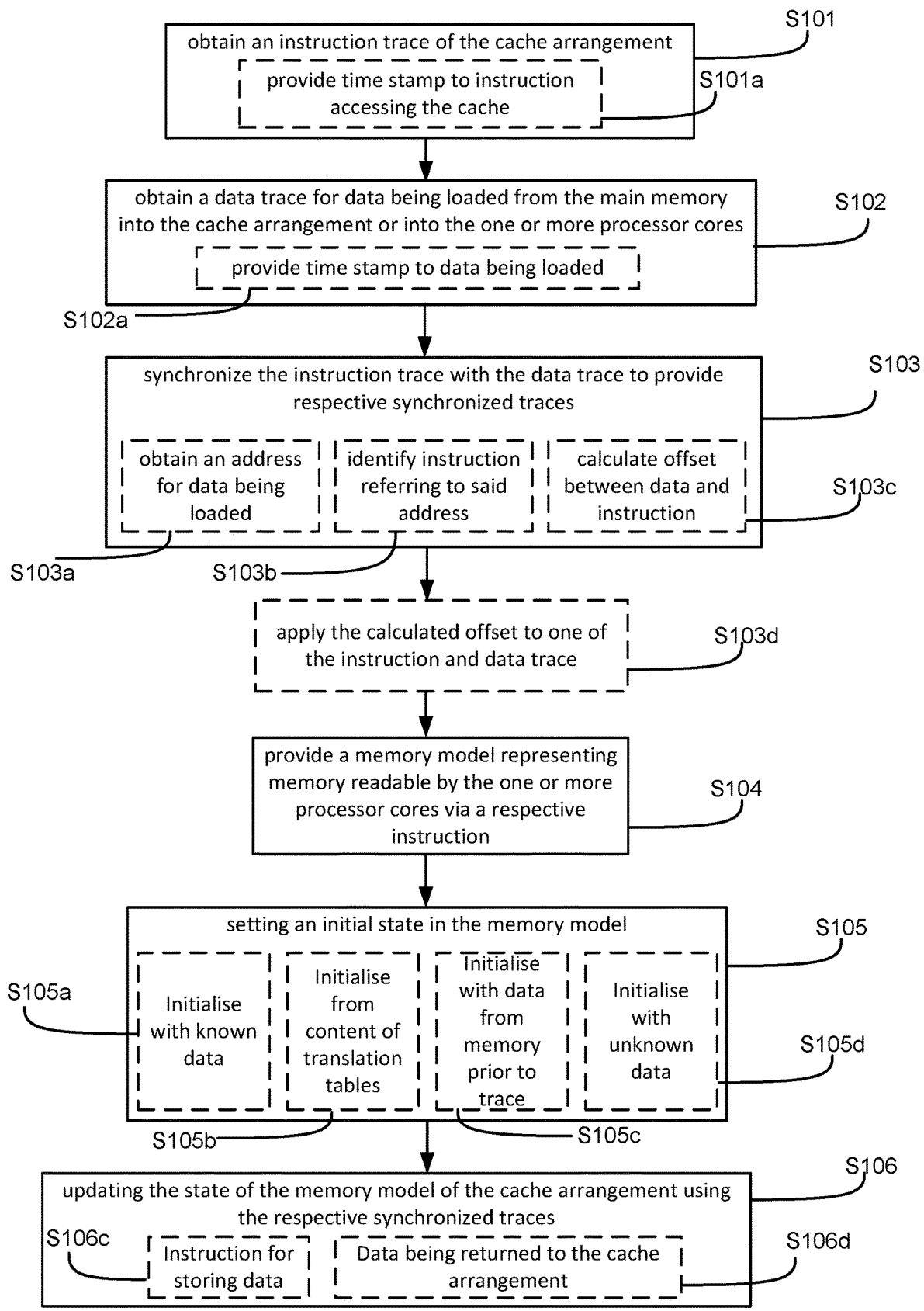
FIG. 4 shows a second embodiment of a method according to the present disclosure.

FIG. 4 illustrates a further example embodiment of the method performed in a debug host. While obtaining the instruction stream and the data stream time stamps are provided to both streams. In particular, a time stamp is provided in step S101a at least to instructions in the instruction trace, which access the cache of the cache arrangement. In step s102a, the time stamp is provided to data being loaded into the cache. Those time stamps comprise a counter, which is incremented with each data and instruction, respectively. Alternatively, the time stamp can comprise a representation of the clock cycle at which the respective data transfer or the instruction took place. In this case, different clock cycles for the data trace and the instructions trace can be used. These clock cycles can be derived from clock running at different speeds. A synchronization is nevertheless possible as long as the relationship between the two different clock cycles is known. For example, the time stamp for the instruction trace is derived by the processor clock, while the time stamp for the data trace is based on the memory bus clock.

In step S103a a synchronization process is initialized by first obtaining in the data trace an address of the cache arrangement for data being loaded from the main memory into the cache arrangement. In the next step, an instruction in the instruction trace is identified, which refers to said address and also accesses the cache arrangement, for example a read instruction. Apparently the load of data from the main memory to the cache arrangement was due to a cache miss, so the data had to be fetched from the main memory. As the time between a cache miss event and the fetch being performed lies in a well-known predetermined range of about 100 clock cycles, such combinations of cache misses and corresponding fetches can easily be used to synchronize the data and instruction trace. After identifying corresponding addresses in the data and the instruction trace, the offset is calculated in step S103c. In step S103d, the offset is applied to one of the traces to process and analyze the traces further.

Alternatively, a cycle accurate instruction trace of when load store instructions are completed and a cycle accurate trace of the cache reads returned the two streams can be related to each other. There is typically a known minimum delay from when read data for a cache line is made available to the cache until the CPU core can observe it. The same is true from when a write completes until other CPU cores can observe the results. This can be retrofitted to CPUs with cycle accurate instruction trace covering at least loads and stores.

In yet another alternative, synchronization can be done by keeping track in the processor core(s) and cache(s) themselves of which data a "load" instruction can see. Each time one or more of the processor core(s) executes a store or read data to a cache, a counter in the target is updated. This counter is used to stamp the loads and stores that are executed. This allows direct correlation between the data and instruction flows. Since writes and cache fills are normally occurring at less than one per clock cycle this counter counts slower than the cycles. This in turns gives better possibility for compressing the time stamps in the trace streams The initialization process of the memory model in step S105 can be done using different alternatives or a combination thereof. In one solution of step S105a the memory model is initialized using known data obtained from a software image of the program to be executed. The model is therefore primed with data known prior to executing the trace. Alternatively the memory model can be initialized using the content of translation tables, step S105b, with data from the memory (represented by the memory model) prior to execution of the trace, step 105c, for example by a memory dump or general with data marked as not valid. Combinations thereof are also possible. In the case of unknown data, S105d, the data trace has to be run to fill the memory model in order to eventually bring the memory model in sync with what the processor cores(s) in the debug target really observed.

The memory model is updated each time when the instruction trace contains an instruction to store data in the cache arrangement, step S106a. This will ensure that the memory model is updated also when store instruction is executed within the cache arrangement, S106c, or when a processor core writes to a memory location later used in a read instruction by a different processor. Thereby it is ensured that the content of the memory model is the same as the content of the real memory that the processor core observes in the debug target. Further, the memory model is updated with data returned from the main memory, S106d, for example in case of cache misses, when data is loaded from the main memory into the caches.

Figure 5:
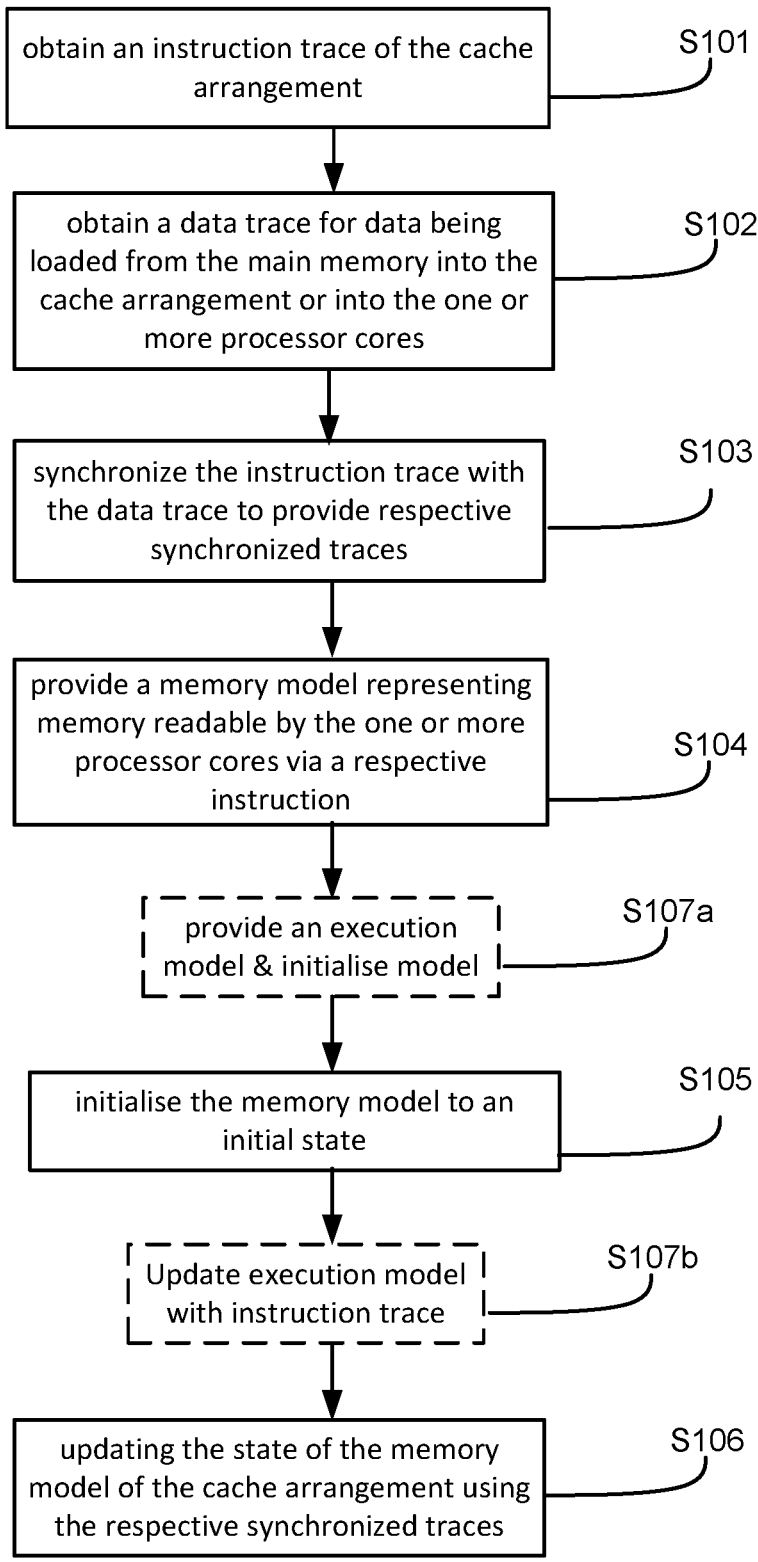
FIG. 5 shows a third embodiment of a method according to the present disclosure.

FIG. 5 illustrates another embodiment. In this example, the method also comprises providing an execution model for further debugging analysis for example. The execution model can be an inherent part of the suite to analyze the execution of software on a computer system or be a separate part thereof. The memory model then communicates with the execution model as if it is memory observable by the processor cores which are simulated with the execution model. In step S107a, an execution model representing the execution pipelines coupled to respective ones of the one or more processor cores are provided and the model is initialized to set the modelled registers and internal configuration to a predetermined initial state. As the execution model is deterministic it will behave in a similar way to the processor cores it simulates, thereby allowing to analyze the behavior of software execution without actual executing the software. The execution model is also updated using the instruction trace in step S107b or parts thereof ensuring a similar behavior compared to the processor cores in the debug target. While the method steps shown in FIGS. 3 to 5 are illustrated in sequential order, it is apparent that some of those steps can be executed in parallel. For example, updating the execution models and memory models will often be done in parallel or in an order given by the respective traces.

Figure 6:
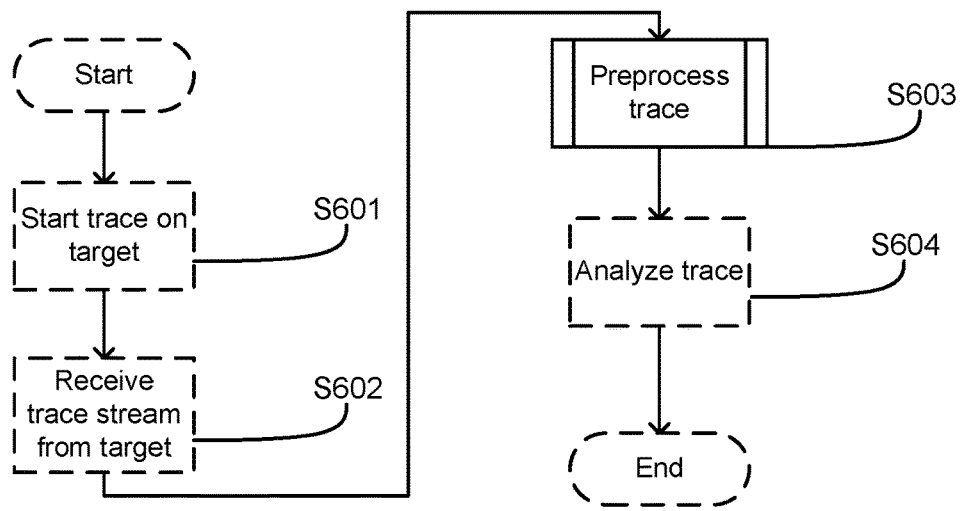
FIG. 6 illustrates an embodiment of a trace and evaluation procedure making use of aspects of the present disclosure.

FIG. 6 provides an example for the whole tracing process, for which the proposed method is part of. The debug host initiates tracing on the target in step S601, in case of an interactive session. If the trace is taken at a separate time from the analysis it may also be initiated by the debug target itself. The trace is then received and stored in the debug host in step S602. The output from the trace is one instruction trace stream and one data trace stream. The trace streams may be separate or combined into a combined stream comprising both instruction traces and data traces, as discussed above. The trace can also be stored outside the debug host and made available to the debug host. The stream(s) is preprocessed in the debug host in step S603. The debug host may also be used for later analyzing in step S604 the traces in greater detail and study the results of the preprocessing. Such analysis may include but not limited to debugging, crash analysis, memory leakage analysis, performance optimization and the like.

Figure 7:
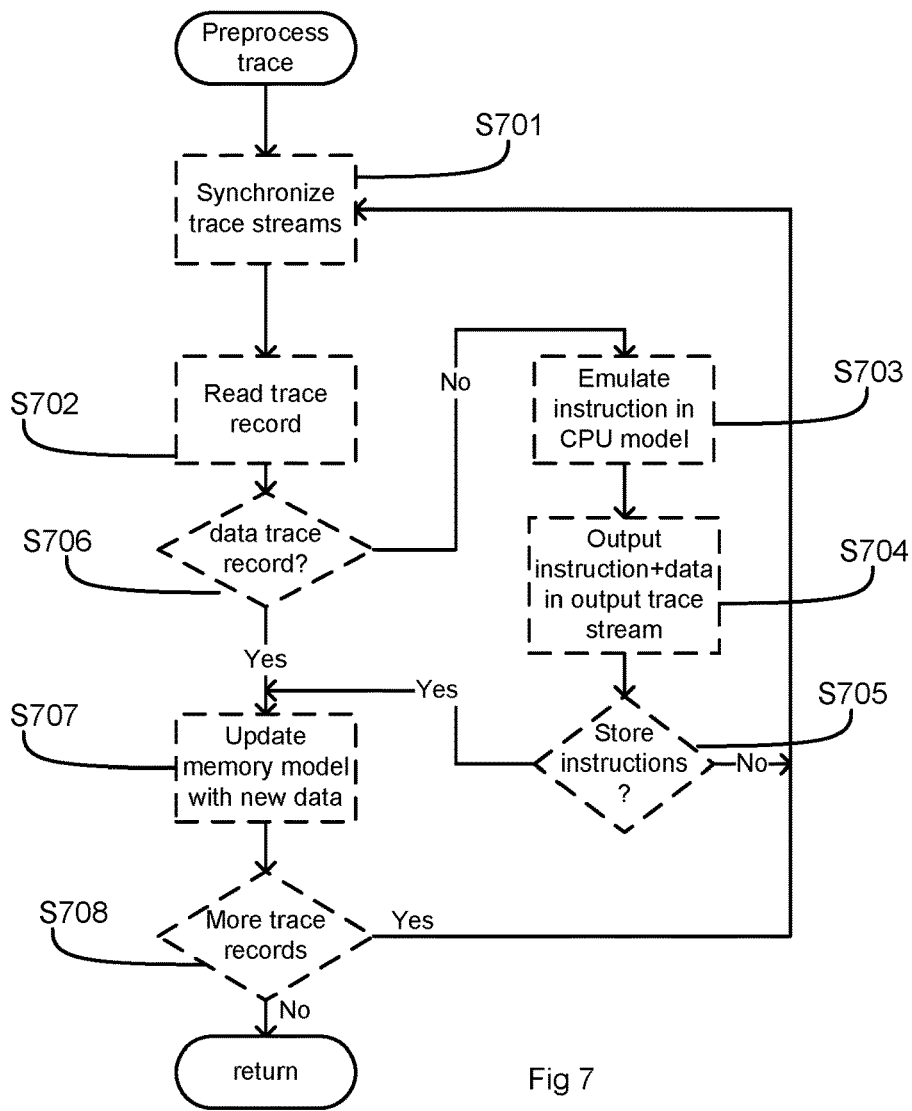
FIG. 7 shows a more detailed view of a step of the previous embodiment.

The trace preprocessing step S603 in the debug host is also illustrated in greater detail in FIG. 7. In a first step S701 (corresponding to step S103 of FIG. 3), an evaluation will be performed, if the traces are synchronized. If, for example the trace format of both traces provides such synchronization explicitly, then that information can be used directly. If the trace format does not include such synchronization between both traces, an offset between the data trace and the instruction trace can be determined by matching the cycle count for a load instruction that ended up being a cache miss with the cycle count of the read data trace from the cache for that memory location.

In an example such synchronization can follow the following procedure. At first, a rough alignment is done based on their initial position in the trace. If the instruction trace and the data trace contain embedded synchronization marks, then the instruction trace and the data trace are played forward counting clock cycles while looking for corresponding synchronization marks. When synchronization marks are found in both traces, the offset between it is calculated, and the offset is used to tune the relative stream positions using the calculated offset. The trace streams are then rewound and the simulation of the execution model and the memory model are started. Due to still imperfectly matched trace streams, contradictions between the simulated core by the execution model and synchronization information in the instruction trace stream are expected. During the simulation, the data trace is parsed and so called "cache read data" is found in the data trace stream. Upon identifying a cache read data, a search of the instruction trace is conducted to find a corresponding read instruction from the same address indicated in the execution model, and located within a predetermined uncertainty in number of clock cycles between the two traces. This is due to the fact that a cache read data is most likely based on a cache miss, in which one of the cores in the debug target (simulated by the execution model) tried to unsuccessfully read data from the cache (represented by the memory model). The data is not yet available, but has to be fetched from the main memory, consequently resulting in the cache read data in the data trace. If the read is found the offset between the traces can be calculated, for example based on the known delay through the cache system. The relative stream positions are then tuned using the calculated offset. Finally, both traces are rewound and the simulation restarted. This approach can be used repetitively so to ensure a continuous synchronization, which might be useful if the traces are erroneous or not fully complete.

In step S702, the combined trace record is read and in step 706 evaluated if the respective entry is part of the instruction trace record or the data trace record. In the latter case, the entry is used to update the memory model in step S707. If the trace record entry is an instruction trace record entry, the entry is forwarded to the execution model in S703, for example to a model of the corresponding CPU execution pipeline (one per traced core) to pace execution there. This is done such that the instructions execute at the proper time with respect to all other updates to the memory model in step S703. When emulating the instructions at the time specified by the instruction records the memory model is updated in step S707, e.g. "read" from the memory model and "stores" from the execution pipeline are sent to update the memory model, step S705 ("Yes"). Loads by the instruction emulation are implemented by reading from the memory model.

If the read trace record contains a data entry in step S706, the record is sent to the memory model to update the knowledge it has of the contents of memory. By doing this, information about external stimuli is continuously entered into the memory model.

Further to the above, the executed instructions and associated data, if any, are recorded for later use in step S704. Hence, the instruction and data output is now recreated on the host and can be used in the same way as if it was traced directly from the debug target. This process of processing trace records is repeated until the trace is exhausted, S708, or the process is interrupted on the debug host. The obtained output in step S704 can be further used for trace analysis, because the content of the output resembles the record of executed instructions as it would in a processor with data trace in the CPU execution pipeline itself.

The present disclosure enables the emulation of a deterministic model representing one or more processor cores of a debug target using a memory model whose content is updated in the same way as a memory observable by those processor core(s). For this purpose traces of the debug target are received and processed to update the memory model. The debug host uses those traces to build up an evolving view of the memory available to the processor core(s) and particularly to the execution pipeline instruction and data read parts.

The invention claimed is:

1. A method, performed in a debug host, for observing software execution on a debug target computer having one or more processor cores, a cache attached to the one or more processor cores via respective one or more execution pipelines forming a cache arrangement, and a memory attached to the cache arrangement, the method comprising steps of:
    obtaining an instruction trace of the cache arrangement;
    obtaining a data trace for data being loaded from the memory into the cache arrangement from which the data is then directly accessible to the one or more processor cores;
    synchronizing the instruction trace with the data trace to generate a synchronized data trace and a synchronized instruction trace; and
    updating a state of a memory model, representing a memory readable by the one or more processor cores via a respective instruction, using the synchronized data trace and the synchronized instruction trace, wherein the updated memory model represents a data space to which the one or more processor cores of the debug target computer have direct access via respective read and write instructions,
    wherein the steps of obtaining the instruction trace and obtaining the data trace comprise providing a time stamp:
    to the data being loaded; and/or
    at least to instructions in the instruction trace accessing the cache within the cache arrangement; and
    wherein the instruction trace and the data trace are cycle accurate, and wherein the step of synchronizing the instruction trace with the data trace comprises:
    obtaining an address in the cache arrangement for the data being loaded from the memory into the cache arrangement in the data trace;
    identifying an instruction in the instruction trace accessing the cache arrangement and referring to said address;
    calculating an offset between a time stamp of said data associated with the address and a time stamp of said instruction accessing the cache arrangement and referring to said address; and
    applying the calculated offset to one of the instruction trace and the data trace for further processing.

2. The method according to claim 1, wherein updating the state of the memory model is triggered by one of:
    data from the synchronized data trace;
    instructions from the synchronized instruction trace writing to the memory readable by the one or more processor cores.

3. The method according to claim 1, further comprising at least one of:
    providing the memory model in the debug host; and
    setting an initial state in the memory model.

4. The method according to claim 3, wherein the step of setting an initial state in the memory model comprises at least one of:
    initialising the memory model with known data obtainable from a software image;
    initialising the memory model from previously stored content of translation tables;
    initialising the memory model with data stored in the memory represented by said memory model prior to obtaining the instruction trace and the data trace; and
    initializing the memory model with unknown data.

5. The method according to claim 1, wherein the time stamp comprises one of:
    a counter being incremented and aligned with each of the data in the data trace and the instructions in the instruction trace; and
    a representation of a clock cycle aligned with at least one of the data in the data trace and the instructions in the instruction trace.

6. The method according to claim 1, wherein the one or more processor cores are configured to read, via a respective instruction, at least one of:
    the cache; and
    internal registers of the one or more processor cores.

7. The method according to claim 1, wherein the step of updating the state of the memory model comprises the step of updating the state of the memory model triggered by at least one of:
    an instruction for storing or writing data into the cache arrangement; and
    any data being returned to the cache arrangement from the memory.

8. The method according to claim 7, wherein the updating of the state of the memory model comprises a step of providing data produced by one or more instructions by an execution model.

9. The method according to claim 1, wherein obtaining the instruction trace and obtaining the data trace comprises obtaining in a combined trace stream both the instruction trace and the data trace, and wherein the method comprises:
    separating the combined trace stream to obtain the instruction trace and the data trace.

10. The method according to claim 1, further comprising:
    an execution model representing the one or more execution pipelines coupled to respective ones of the one or more processor cores;
    initialising the execution model to set modelled registers and internal configuration of the one or more processor cores to a respective initial state.

11. The method according to claim 10, comprising a step of:
  updating the execution model with the synchronized instruction trace.

12. The method according to claim 1, wherein said debug host is separate from the one or more processor cores and the cache arrangement.

13. A nontransitory computer readable medium comprising a computer program comprising program code for performing a method when said computer program is executed on a processor of a debug host, wherein the method is for observing software execution on a debug target computer having one or more processor cores, a cache attached to the one or more processor cores via respective one or more execution pipelines forming a cache arrangement, and a memory attached to the cache arrangement, the method comprising steps of:
  obtaining an instruction trace of the cache arrangement;
  obtaining a data trace for the data being loaded from the memory into the cache arrangement from which the data is then directly accessible to the one or more processor cores;
  synchronizing the instruction trace with the data trace to generate a synchronized data trace and a synchronized instruction trace; and
  updating a state of a memory model, representing a memory readable by the one or more processor cores via a respective instruction, using the synchronized data trace and the synchronized instruction trace, wherein the updated memory model represents a data space to which the one or more processor cores of the debug target computer have direct access via respective read and write instructions,
  wherein the steps of obtaining the instruction trace and obtaining the data trace comprise providing a time stamp:
  to the data being loaded; and/or
  at least to instructions in the instruction trace accessing the cache within the cache arrangement; and
  wherein the instruction trace and the data trace are cycle accurate, and wherein the step of synchronizing the instruction trace with the data trace comprises:
  obtaining an address in the cache arrangement for the data being loaded from the memory into the cache arrangement in the data trace;
  identifying an instruction in the instruction trace accessing the cache arrangement and referring to said address;
  calculating an offset between a time stamp of said data associated with the address and a time stamp of said instruction accessing the cache arrangement and referring to said address; and
  applying the calculated offset to one of the instruction trace and the data trace for further processing.

14. A debug host configured to observe software execution on a debug target computer having one or more processor cores, a cache attached to the one or more processor cores via respective one or more execution pipelines forming a cache arrangement, and a memory attached to the cache arrangement, the debug host comprising:

a trace interface configured to receive a trace stream, comprising a data trace and an instruction trace, wherein the data trace is a trace of data being loaded from the memory into the cache arrangement from which the data is then directly accessible to the one or more processor cores,
  one or both of a synchronization module circuit and synchronization module software, configured to synchronize the instruction trace with the data trace to generate a synchronized data trace and a synchronized instruction trace;
  a memory model, representing a memory readable by the one or more processor cores via respective instructions of the debug target computer; and
  an update module circuit configured to update a state of the memory model using the synchronized data trace and the synchronized instruction trace, wherein the updated memory model represents a data space to which the one or more processor cores of the debug target computer have direct access via respective read and write instructions,
  wherein the trace interface is configured to provide a time stamp:
  to the data being loaded; and/or
  at least to instructions in the instruction trace accessing the cache within the cache arrangement; and
  wherein the instruction trace and the data trace are cycle accurate, and wherein one or both of the synchronization module circuit and synchronization module software are configured to:
  obtain an address in the cache arrangement for the data being loaded from the memory into the cache arrangement in the data trace;
  identify an instruction in the instruction trace accessing the cache arrangement and referring to said address;
  calculate an offset between a time stamp of said data associated with the address and a time stamp of said instruction accessing the cache arrangement and referring to said address; and
  apply the calculated offset to one of the instruction trace and the data trace for further processing.

15. The debug host according to claim 14, further comprising one or both of a trace router circuit and trace router software, each being configured to receive the trace stream from the trace interface and to separate the received stream into the instruction trace and the data trace.

16. The debug host according to claim 14, further comprising a processor and a debug host memory wherein the memory model is formed within the debug host memory and the processor is configured to implement the synchronization module circuit.

17. The debug host according to claim 16, further comprising an execution model at least partly formed in the processor.

18. The debug host according to claim 14, wherein the debug host is configured to store the received instruction trace and the received data trace.

* * * * *